(12) United States Patent　　(10) Patent No.: US 7,455,031 B2
　　　Axelrod　　　　　　　　　　　(45) Date of Patent: Nov. 25, 2008

(54) ADJUSTABLE CAGE FEEDER

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 0 days.

(21) Appl. No.: 11/533,208

(22) Filed: Sep. 19, 2006

(65) Prior Publication Data

US 2007/0051319 A1　　Mar. 8, 2007

Related U.S. Application Data

(62) Division of application No. 11/140,125, filed on May 27, 2005, now Pat. No. 7,107,930, which is a division of application No. 10/205,789, filed on Jul. 26, 2002, now Pat. No. 6,928,953.

(51) Int. Cl.
　　*A01K 39/00*　　(2006.01)
(52) U.S. Cl. ..................................... 119/464; 119/51.01
(58) Field of Classification Search .................. 119/63, 119/51.01, 51.04, 459, 462, 464, 467, 475, 119/477; 43/102, 55, 56
See application file for complete search history.

(56) References Cited

U.S. PATENT DOCUMENTS

| | | | |
|---|---|---|---|
| 299,690 A * | 6/1884 | Sherwood | ....................... 43/56 |
| 321,860 A | 7/1885 | Sell | |
| 1,575,101 A | 2/1926 | Edwards | |
| 1,647,069 A | 10/1927 | Ahlman | |
| 1,869,901 A | 8/1932 | LeFever | |
| 1,934,980 A | 11/1933 | Hulland et al. | |
| D103,963 S | 4/1937 | Butler | |
| 2,658,709 A | 11/1953 | Kendall | |
| 2,754,800 A * | 7/1956 | Gare | ....................... 119/51.04 |
| 2,888,905 A | 6/1959 | Hume | |
| 2,988,048 A * | 6/1961 | Zimmerman | ................. 119/81 |
| 3,049,093 A | 8/1962 | Oliver | |
| 3,119,372 A | 1/1964 | Gantz | |
| 3,361,116 A | 1/1968 | Daniel et al. | |
| 3,398,719 A | 8/1968 | Walker | |
| 3,415,226 A | 12/1968 | Cheung | |
| 3,628,505 A * | 12/1971 | Myers | .......................... 192/61 |
| 3,786,786 A * | 1/1974 | Gravos | ......................... 119/54 |

(Continued)

OTHER PUBLICATIONS

The International Search Report or the Declaration. International Application No. PCT/US03/23128. Applicant: T.F.H. Publications, Inc. Date of Mailing: Dec. 10, 2004. 4pgs.

*Primary Examiner*—Kimberly S Smith
(74) *Attorney, Agent, or Firm*—Grossman Tucker Perreault & Pfleger PLLC

(57) ABSTRACT

A feeder for a cage, designed to reduce the scattering of food and to provide a cleaner and healthier caged environment, wherein the cage has a wall and an interior space for housing an animal such as a bird, including a cage door. The feeder comprises a feeder mechanism which includes a feeder receptacle attached to an extension structure, wherein the extension structure extends between the receptacle and the wall of said cage. The extension structure is manually engageable and adjustable for positioning the feeder receptacle at a selected location in the interior space of the cage and at a selected location at a cage door for access to the feeder receptacle.

4 Claims, 6 Drawing Sheets

U.S. PATENT DOCUMENTS

| | | | |
|---|---|---|---|
| 3,841,267 A * | 10/1974 | Miller | 119/266 |
| 4,497,278 A | 2/1985 | Balder et al. | |
| 4,765,089 A * | 8/1988 | Rowe | 43/102 |
| 4,976,223 A * | 12/1990 | Pierce | 119/61.56 |
| 5,000,124 A | 3/1991 | Bergen | |
| 5,054,431 A * | 10/1991 | Coviello | 119/61.56 |
| 5,152,247 A | 10/1992 | Brown | |
| 5,165,363 A * | 11/1992 | McGinty | 119/464 |
| 5,289,796 A | 3/1994 | Armstrong | |
| 5,421,289 A | 6/1995 | Capellaro | |
| 5,634,430 A | 6/1997 | Brostowicz | |
| 5,651,521 A | 7/1997 | Aberg | |
| D383,877 S | 9/1997 | Doornbos | |
| 5,713,305 A | 2/1998 | Hollaway et al. | |
| 5,819,689 A | 10/1998 | Simon | |
| 5,855,184 A | 1/1999 | Eichler et al. | |
| 5,931,121 A | 8/1999 | Haselden | |
| 5,975,023 A * | 11/1999 | Schlick | 119/467 |
| 6,435,134 B1 | 8/2002 | Ho | |
| 6,736,088 B1 * | 5/2004 | McGregor et al. | 119/708 |
| 6,928,953 B2 | 8/2005 | Axelrod | |
| 7,107,930 B2 | 9/2006 | Axelrod | |
| 2006/0288946 A1 * | 12/2006 | Brillon | 119/61.56 |

* cited by examiner

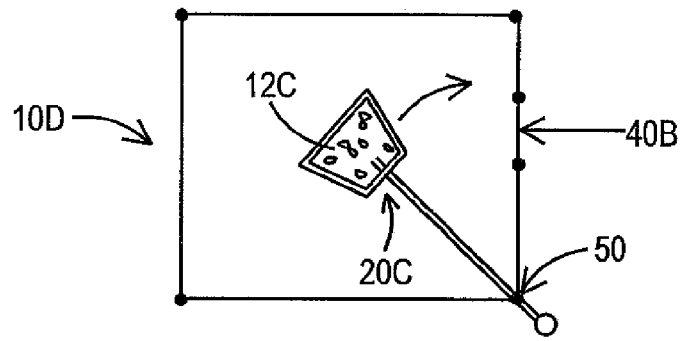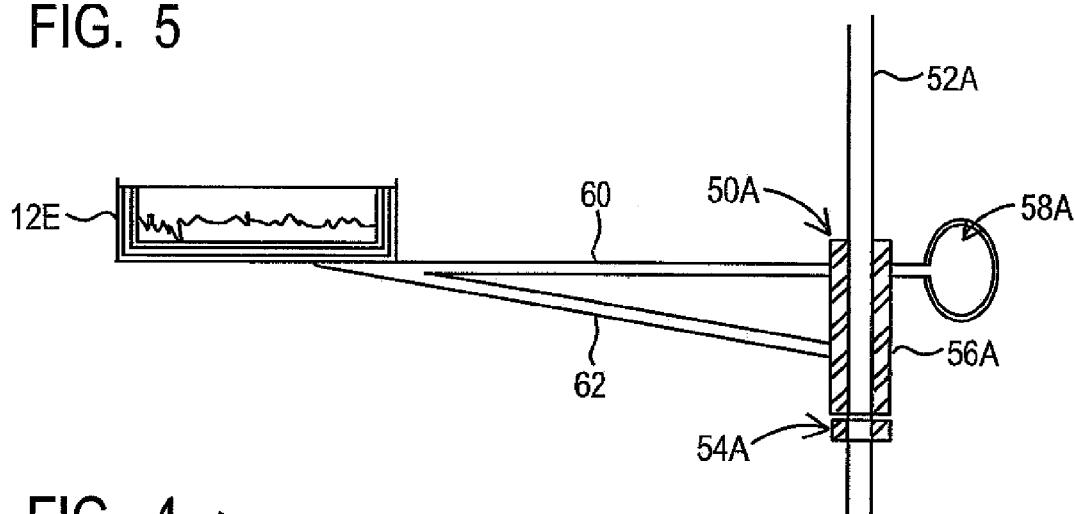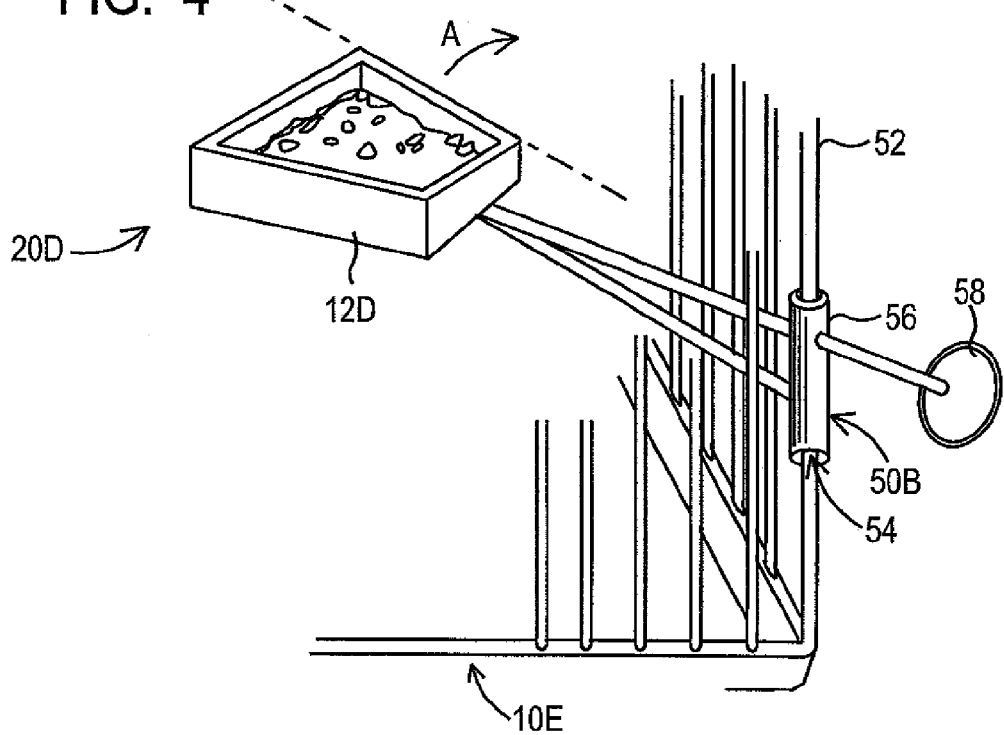

ADJUSTABLE CAGE FEEDER

CROSS REFERENCE TO RELATED APPLICATIONS

The present application is a divisional of U.S. application Ser. No. 11/140,125 filed May 27, 2005 (now U.S. Pat. No. 7,107,930), which is a divisional of Ser. No. 10/205,789 filed Jul. 26, 2002 (now U.S. Pat. No. 6,928,953), the teachings of which are incorporated herein by reference.

FIELD OF THE INVENTION

This invention is directed at an animal feeder in general and more particularly to a cage-mounted feeder which positions one or more feeding dishes away from the cage's perimeter and toward the center of the cage so that the scattering of feed is contained substantially within the cage. The feeder allows the dish to be mechanically moved and positionally exchanged between the perimeter of the cage and a location within the cage for ease of access in filling, emptying or cleaning of the dish.

BACKGROUND OF THE INVENTION

Small animals, particularly birds, are often housed for long periods of time within some sort of cage. In order to feed these animals, it is necessary to gain access to the interior of the cage. It is also advantageous if the feeding station or one or more dishes are located away from the perimeter and towards the center of the cage so that any scatter of food or water does not fall outside the cage, and so that the animals (preferably birds) have room to access the dish without being encumbered by the walls of the cage.

Most cages have feeding dishes attached to the perimeter of the cage for ease of access by the caretaker and sometimes include a small door located in a sidewall of the cage, and separate from the main access door, to refresh/replace or clean the food and water dishes. Thus, when the food/water dish is placed at the perimeter of the cage, it makes it easy to service, but also makes it more likely that food will fall outside the cage. When the dish is located in the center of the cage, it is much more difficult to access and service, because one needs to open the main door to get to the dish, thereby engaging with the occupant of the cage who may want to escape, or play, or run and hide.

Various patents have been identified which seek to address the above referenced problem of scatter. For example, U.S. Pat. No. 5,713,305 to Oveta and Robert Hollaway discloses a feeder which is clamped to the wall of the bird cage and comprises a rigid extension bar which is not capable of maneuvering for access, but rather is stationary, permanently locating the feeding dish at the center of the cage. U.S. Pat. No. 5,289,796 discloses a bird feeder to be hung from a tree with a height adjustment to allow the entirety of the feeder to be lowered for gaining access thereto.

Attention is also directed to U.S. Pat. No. 5,634,430 entitled "Reduced Mess Bird Feeder" which discloses a bird feeder which is designed so that a feeding bird leaves a reduced amount of bird food in an area outside the bird cage when compared to a conventional bird feeder. Such feeder relies upon the use of a plurality of feeder dishes and a pedestal, the pedestal including a base permanently positioned within the cage center. In addition, attention is directed to U.S. Pat. No. 1,575,101 which appears to again disclose the permanent positioning of a bird feeder at the cage center.

Other patents of general interest include U.S. Pat. No. 3,119,372 entitled "Bird Cage Feeder Device", U.S. Pat. No. 3,415,226, entitled "Bird Feeder".

In spite of all the above disclosures, there still remains a need for a consumer friendly feeding device that facilitates the ability to easily replenish the bird feeder, yet which also positions the feeder at a location within the cage to minimize scatter. The present invention, therefore, has as its principal object the development of such a bird or small animal feeding device that can be conveniently positioned at different locations within the cage so that the feeder can be readily accessed at a perimeter/door location, yet repositioned and relocated within the cage environment to reduce the amount of feed, seeds and husks that are naturally scattered by the bird or other animal, and to reduce the amount of attention necessary by the bird/animal owner to maintain a clean and healthy environment.

It is thus, also an object of this invention to provide an apparatus for feeding small animals or birds contained in a cage by providing a centralized feeder which can be maneuvered to the cage wall for access through the door by the caretaker.

It is a further object of this invention to provide a centralized feeder for a cage that can be positioned within the cage without the main cage door being open, It is further object of this invention to provide a centralized feeder for a cage that does not require a secondary access door at the perimeter of the cage.

It is still further object of the present invention to provide a feeder apparatus for a cage that provides adjustability and maneuverability of the feeder apparatus to various locations within the cage for cleaning, rearrangement, etc.

It is a further object of this invention to provide a feeder apparatus that is easy to access and which substantially contains scattering of food and/or liquid inside the cage due to its position.

It is still further object of the present invention to provide a feeder apparatus containing the above mentioned attributes which can also simultaneously serve as a perch while the occupant feeds.

It is a still further object of the present invention to provide a maneuverable feeder apparatus for a cage which provides a means for supporting containers for water, food, etc

SUMMARY OF THE INVENTION

A feeder for a cage, designed to reduce the scattering of food and to provide a cleaner and healthier caged environment, wherein the cage has a wall and an interior space for housing an animal such as a bird, including a cage door. The feeder comprises a feeder mechanism which includes a feeder receptacle attached to an extension structure, wherein the extension structure extends between the receptacle and the wall of said cage. The extension structure is manually engageable and adjustable for positioning the feeder receptacle at a selected location in the interior space of the cage and at a selected location at a cage door for access to the feeder receptacle.

BRIEF DESCRIPTION OF THE DRAWINGS

To better understand and appreciate the invention, refer to the following detailed description in connection with the accompanying drawings:

FIG. 3 is a top view of the cage of FIG. 4 with the top bars removed for clarity according to a second embodiment of the present invention.

FIG. 4 is a perspective view of the second embodiment of the present invention.

FIG. 5 is a cross-sectional side view of the second embodiment of the present invention.

Figure 1:
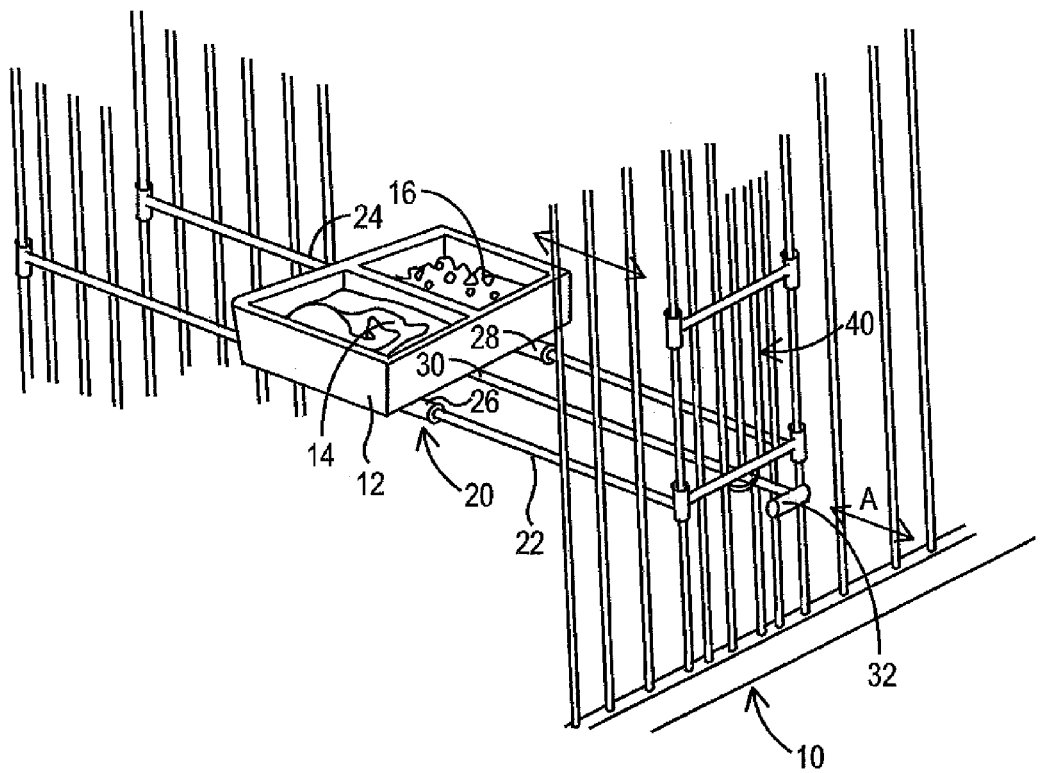
FIG. 1 is a perspective view of a cage feeder apparatus constructed according to one embodiment of the present invention.

In the appended drawings common elements use the same numeric character but are distinguished by the addition of a letter to identify a common element between embodiments (for instance 10, 10A, 10B, etc.).

DESCRIPTION OF PREFERRED EMBODIMENTS

The present invention comprises a feeder preferably having one or more dishes or feed receptacles which are connected to a push/pull or pivoting rod which extends outside the cage and is maneuverable in a variety of planes (in/out—xy-plane along the x axis, up/down—zx or zy-plane along the z axis) or axially in the xy-plane around a pivot point at the edge of the cage such that the dish can be easily placed at the center of the cage for feeding and moved close to the door of the cage for filling and cleaning. In addition, the positioning mechanism may also comprise a retractable/foldable arm, an arm pivoted off another location inside the cage other than the cage wall, or a combination of rods or arms that allow for positional adjustment in multiple planes. In the case of the feeder being suspended from the ceiling of the cage, the attachment mechanism may be flexible such as a cord.

The feeder of the present invention is attached to the exterior of the cage through a rod or series of rods which can be maneuvered to allow access by the animal/bird at the center of the cage and by the caretaker through a cage door.

While the cages shown in the drawings and described herein are drawn as rectangular in shape, the cages could be of nearly any shape (round, hexagonal, dome-shaped, etc.) to contain a small animal or bird as its temporary or permanent home. In addition, all of the various features illustrated and discussed below within each preferred embodiment are understood to be applicable within all of the preferred embodiments discussed herein.

FIG. 1 shows a preferred cage 10 which has a feeder mechanism installed therein. In the interest of clarifying the invention, only some of the bars of the cage are shown, while others have been removed. The feeder mechanism 20 as shown contains a receptacle 12 having two removable dishes or fixed cavities for containment of food 14 and water 16. The receptacle 12 of the invention could contain more or less cavities depending on what may be desirably fed to the occupant of the cage.

The receptacle 12 travels on two rails 22, 24 which are slidably engaged with hollow tubes 26, 28 on the bottom of the receptacle 12. The rails 22, 24 are attached at opposite sides of the cage to act as a height locating device for the feeder receptacle between the door 40 of the cage and the cage floor. The rails 22, 24 may also act as a perch for the cage occupant to use while feeding. A central rod 30 with a handle 32 is attached to the receptacle 12 and can be used to push or pull the receptacle 12 to a position near the center of the cage for feeding or to the door 40 at the edge of the cage for servicing (filling, emptying or cleaning the dishes or cavities in the receptacle 12).

The receptacle 12 may contain similarly shaped dishes which fit into the cavities of the receptacle 12 which may then be interchanged with other dishes for ease of cleaning, filling, etc.

Figure 2:
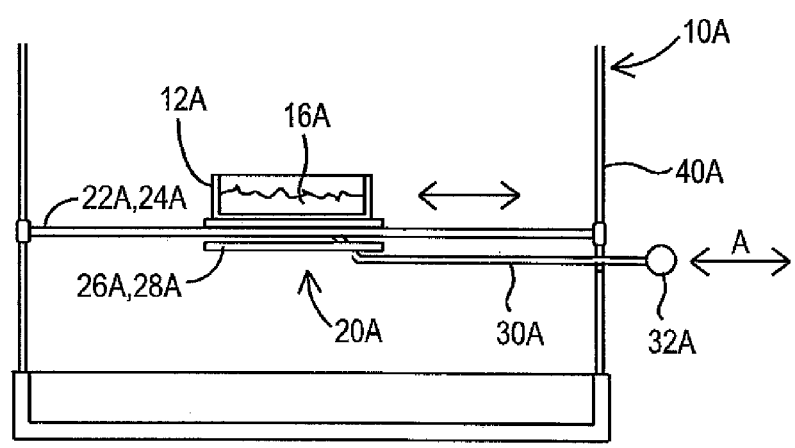
FIG. 2 is a cross-sectional side view of the cage feeder apparatus of FIG. 1.

FIG. 2 show the cage 10A and feeder mechanism 20A in cross-sectional side view, again with most of the cage bars removed for clarity of presentation. Here, the rod 30A is extended nearly its full length to position the feeder mechanism 20A near the center of the cage 10A. As the arrow A indicates, by pulling on the handle 32A, the feeder mechanism 20A can be maneuvered to close proximity of the door 40A of the cage 10A. This eliminates the need to reach into the center of the cage to access the receptacle 12A. Again, with the feeder near the center of the cage 10A, spillage from the receptacle 12A will be contained within the cage.

Figure 8:
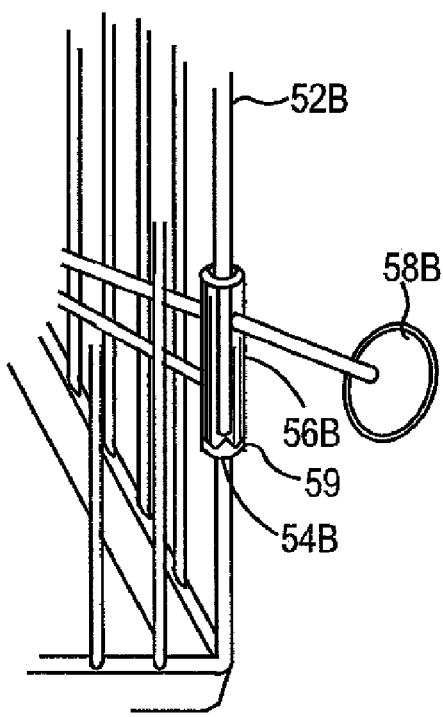
FIG. 8 is a partial perspective view of the pivoting mechanism of FIG. 4.

Turning to FIGS. 3-5, a second preferred embodiment of the present invention is shown, where in FIG. 3, the feeder mechanism 20C can be easily maneuvered near the center of the cage or to the access door 40B as shown by the arrow B. In this embodiment, a pivoting (see FIG. 3 for a top view with bars removed for clarity) mechanism 50 is located at the corner of the cage 10D which can pivot the receptacle 12C from near the center of the cage to the access door 40B. FIG. 4 is a perspective view of the second embodiment of the present invention illustrating additional details of the pivot mechanism 50B. The pivot mechanism comprises a hollow tube 56 which slips over the corner bar 52 of the cage 10E and which sits on a fixed collar 54 which is firmly attached to the corner bar 52, locating the height of the pivot mechanism 50B and, thereby, the feed receptacle 12D. As shown in FIG. 8 the fixed collar 54B and tube 56B may each include intermeshing teeth 59 which may act as a detent for positioning the feeder mechanism 20D of FIG. 4 near the center of the cage 10E. Thus, the feeder mechanism can be lifted slightly and rotated to a specific angle and on different planes inside the cage and the intermeshing teeth will guarantee it remains in that position. As shown in FIGS. 4, 5 and 8 a thumb screw 58, 58A and 58B or wing nut may be engaged with a threaded hole in the tube 56, 56A to prevent unwanted horizontal movement of the feeder mechanism 20D. It should be noted that as shown in FIG. 4 it may be advantageous to angle the sides of the feeder receptacle 12C and 12D to match the angle that the receptacle makes when it engages the wall of the cage. Receptacle 12C and 12D may have a removable dish inside.

FIG. 5 is a cross-sectional side view of FIG. 4 showing how the receptacle 12E is supported by rod 60 and rod 62 which is angled down to a lower point on tube 56A to provide vertical stability for receptacle 12E. It should be noted that rods 60 and 62 may be firmly attached to the tube 56A. Furthermore the rod attached to thumbscrews 58A can be releasably engaged to hollow tube 56A, as illustrated in FIG. 5. Furthermore, this concept of fixed rods 60 and 62 and releasable thumbscrew 58A apply to all other preferred embodiments herein.

Figure 6:
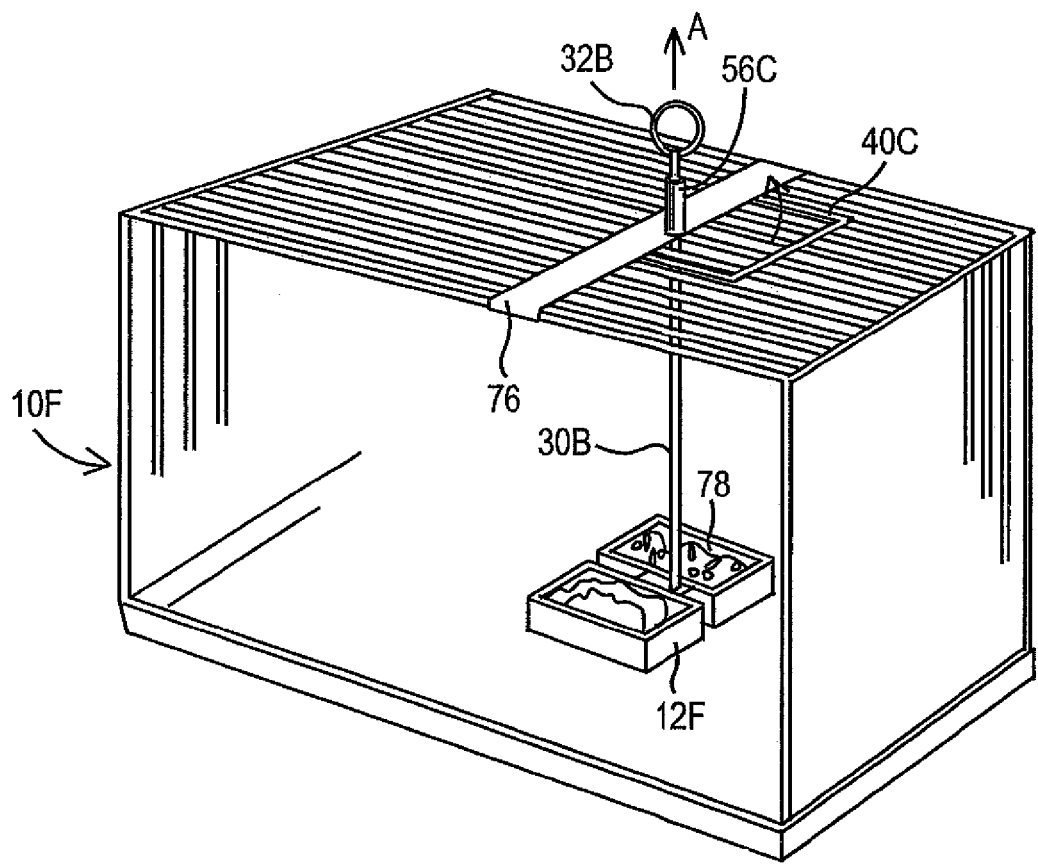
FIG. 6 is a perspective view of a cage feeder apparatus constructed according to a third embodiment of the present invention.
Figure 7:
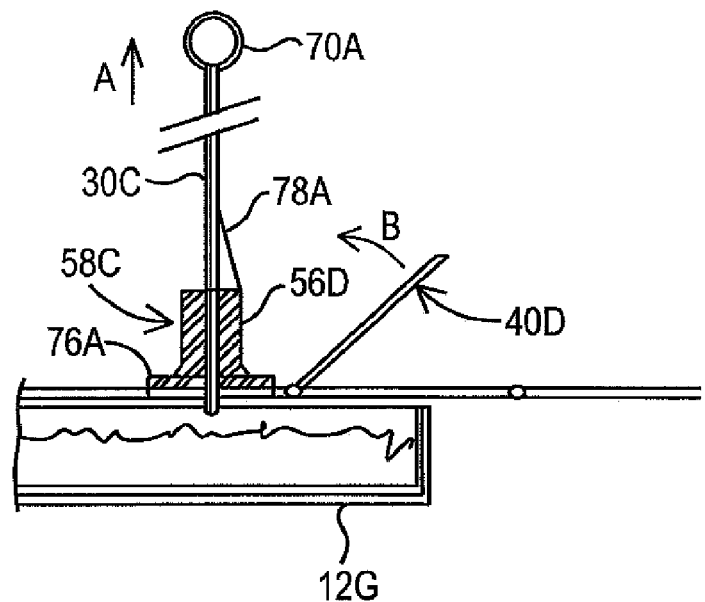
FIG. 7 is a cross-sectional side view of the feeder apparatus in a retracted position for servicing according to the third embodiment.

A third preferred embodiment of the present invention is shown in FIGS. 6 and 7 illustrating a cage design where the access door 40C is located in the top of the cage 10F. Again, some of the cage bars have been removed in the FIGS. to provide clarity to the understanding of the present invention. In this preferred embodiment, gravity is used to assist in lowering the feed receptacle 12F to its desired height in the cage. The mechanism for lowering the receptacle 12F comprises a handle or ring 32B, a rod 30B which is slidably engaged with a hollow tube 56C, which is attached to a central flat bar 76 spanning a portion of the top of the cage 10F.

In FIG. 6 the feeder receptacle 12 F is shown as being in two portions with the rod 30B centered between them for balance. The receptacle may comprise one, two or more removable dishes or fixed cavities surrounding the rod which may then be rotated under the cage door 40C for access.

FIG. 7 is a cross-sectional side view of FIG. 6 showing the rod 30C withdrawn from the cage such that the feeder receptacle 12G is at the top of the cage and in close proximity to the cage door 40D. FIG. 7 shows a spring clip 78A mounted to the rod 30C which secures the feeder receptacle 12G in the up position while it is being accessed. The spring clip 78A remains in an expanded position when the rod is extended into the cage (reference numeral 78 in FIG. 6) and is compressed when the rod 30C is drawn through the tube 74A until the spring clip 78A clears the tube 74A and expands back out to hold the receptacle 12G in the up position (see FIG. 7). Compressing the spring clip 78A, allows the clip and the rod 30C to slide down through the tube 56D and bring the receptacle 12G into a lowered position for access by the occupant of the cage (see FIG. 6). In addition, thumbscrew 58C conveniently holds tube 56D in the up position and/or at any position in the vertical z-plane.

Figure 9:
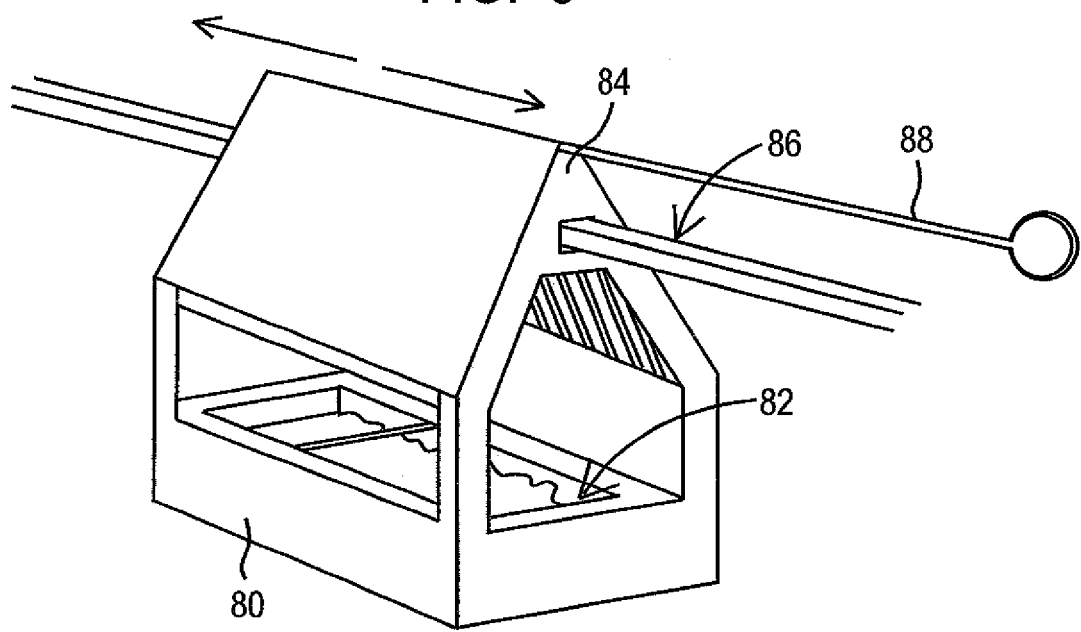
FIG. 9 is another perspective view of another preferred embodiment of the present invention.
Figure 10:
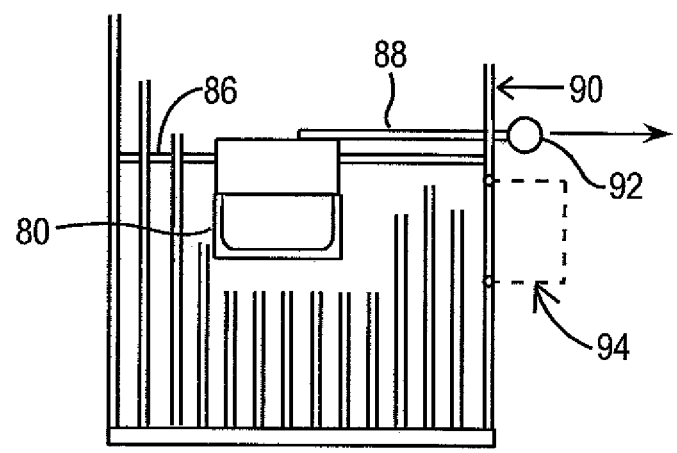
FIG. 10 is a cross-sectional view of the feeder apparatus of FIG. 9.

FIG. 9 illustrates yet another preferred embodiment of the present invention. In this embodiment, the feeder mechanism generally identified at 80 is shown in the form of a house configuration, wherein the feeder receptacles 82 for food and/or water are contained within the feeder, and are removable for ease of replenishing and cleaning. At or near the apex 84 of the house configuration an opening is provided to allow for connection to the rail 86. As can be seen, rail 86 is preferably of square or rectangular shape, or other equivalent geometric shape to restrict rotation of the feeder 80. Extension structure 88 is shown extending between said feeder 80 and the wall of the cage 90. Preferably, in FIG. 10, a side cross-sectional view of FIG. 9, the extension structure 88 extends beyond the cage and includes a handle 92 to facilitate manual engagement by the user so that the feeder mechanism can be selectively positioned at the door 94, which is illustrated in FIG. 10 is open position.

Figure 11:
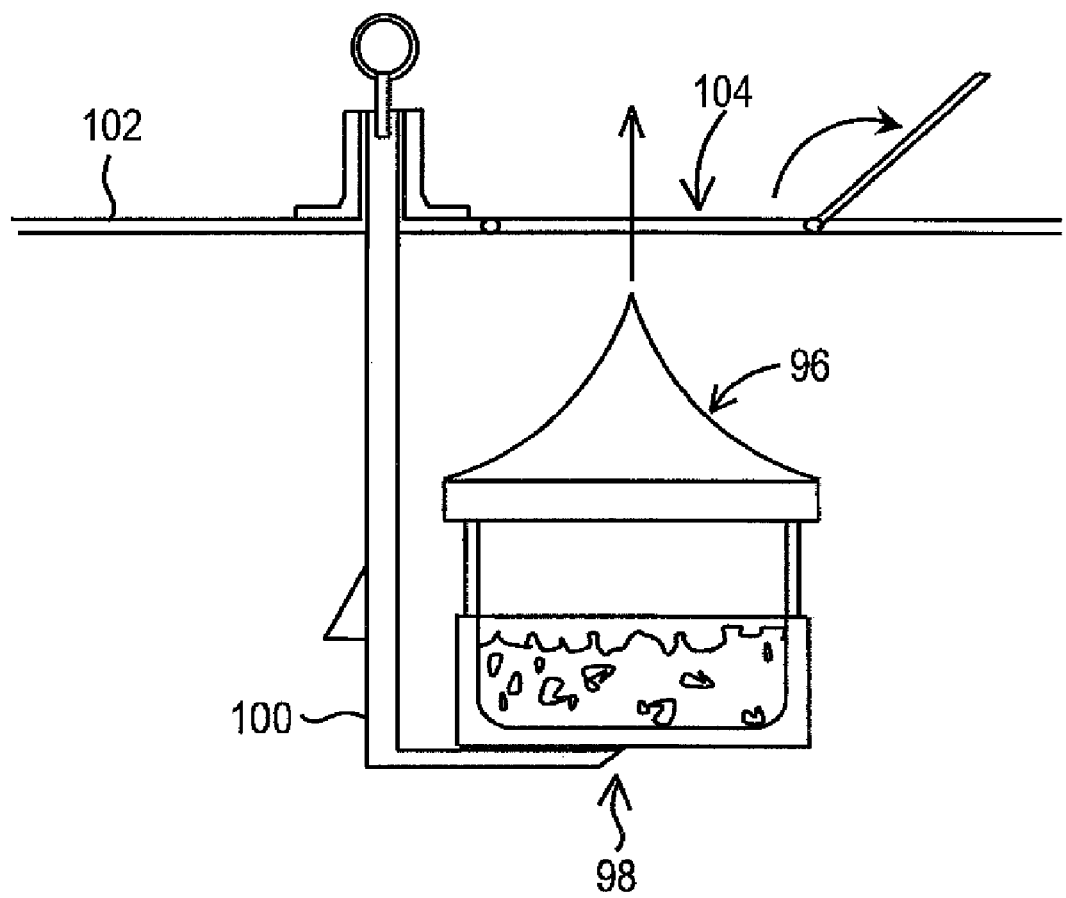
FIG. 11 is another perspective view of another preferred embodiment of the present invention.

FIG. 11 illustrates yet another preferred embodiment of a feeder mechanism 96. In this configuration the feeder mechanism is attached at its bottom location 98 via extension structure 100, which, as shown, preferably comprises two elongated bar sections forming a general right angle configuration. However, in the broad context of the present invention, the extension structure may simply comprise a single bar section attached to the side of feeder mechanism 96. In addition, it can be appreciated that extension structure 100 extends from the roof 102 the cage so that it can be manually engaged and positioned at a selected location in the interior space of the cage and at a selected location at the door opening 104.

The present invention is not limited to the preferred embodiments described herein and could include any of a variety of mechanisms such as folding arm, extendable rod, pivoting, rotating or hanging mechanisms located on or near the perimeter of the cage that allow a feeder receptacle to be maneuvered from near the center of the cage to the perimeter of the cage in proximity to an access door.

In addition, the feeder mechanism described herein may be combined with a mechanical engagement means where upon opening of the cage door, the feeder mechanism is triggered to move the feeder receptacle automatically towards the cage wall and upon closing the cage door, the receptacle is positioned near the cage center.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims, one may practice the invention otherwise than as the description and drawings specifically show and describe.

What is claimed is:

1. A feeder and cage comprising:
   a cage having a roof and an interior space for housing an animal, including a cage door located in said roof, said roof comprising cage bars including a flat bar spanning a portion of the top of the cage;
   a feeder mechanism comprising one or more feeder receptacles attached to an extension structure, said extension structure comprising a rod extending between said receptacle and said roof of said cage, said extension structure manually engageable and adjustable for positioning said feeder receptacle at a selected location in the interior space of said cage and at a selected location at said door for access to said feeder receptacle,
   a hollow tube where said rod is slidably engaged with said tube and said tube is engaged with said flat bar;
   characterized in that said extension structure is engaged to said cage roof so that said feeder can be raised and lowered between said selected location in the interior space of said cage and at said selected location at said cage door and that said extension structure is surrounded by said one or more feeder receptacles and which can be rotated under the cage door.

2. The feeder and cage of claim 1, wherein said feeder mechanism includes a mechanism to secure said feeder at a selected location between said raised and lowered location, including said raised and lowered locations.

3. The feeder and cage of claim 2 wherein said mechanism to secure said feeder in said raised position comprises a spring clip.

4. The feeder and cage of claim 1 wherein said feeder receptacle includes one or more cavities for containment of food and water.

* * * * *